United States Patent Office 3,108,044
Patented Oct. 22, 1963

3,108,044
MEDICAMENT OF POLYSTYRENE ANION EXCHANGE RESIN HAVING A BARBITURATE ADSORBED THEREON
Stephen Paul Rety, Wilfred Herbert Linnell, and Herbert Timmington, Richmond, England, assignors to Clinical Products Limited, Slough, England, a British company
No Drawing. Filed Oct. 1, 1958, Ser. No. 764,486
Claims priority, application Great Britain Oct. 3, 1957
8 Claims. (Cl. 167—65)

It is desirable in the field of therapeutics to provide preparations adapted to give sustained release of drugs in the body when administered by the mouth. It has previously been proposed to use physical methods for retarding the release of the drug, e.g. by making tablets which disintegrate slowly or by coating pellets with slowly soluble films. It has been found that a more continuous and uniform release of the drug over a long period of time can be obtained if the drug is chemically bound to a solid carrier, from which it is slowly released by the action of the normal contents of the gastro-intestinal tract.

Drugs or therapeutic agents which can usefully be administered by the mouth can be classified as basic agents capable of combining with an appropriate cationic ion-exchange resin to form what may be termed a resinate, or again as an acidic agent capable of combining with an appropriate anionic ion-exchange resin to form a resin-drug compound which would be a salt of the resin acting as a base and the drug acting as the acid.

It is the object of the present invention to provide a method of production of a number of resin-drug compounds prepared as salts of a resin acting as base and a drug acting as acid, and having a slow and even rate of release of the drug when acted upon by the normal contents of the gastro-intestinal tract.

According to the method of the present invention, a suitable basic ion-exchange resin, e.g. a strongly basic anionic exchange resin consisting of a polystyrene polymer crossed linked with divinylbenzene and containing quaternary ammonium groups, is combined with a barbiturate to form a salt.

Suitable resins for use in this method are the basic ionic resins in the chloride or hydroxide forms, and nominally crossed linked with varied amounts of divinylbenzene.

Barbiturates which may be utilised include:

Amylobarbitone
Phenobarbitone
Thiobarbitones
Quinalbarbitone
Butobarbitone
Pentobarbitone The salt formed may be represented by the following general formula structure, exemplified with amylobarbitone:

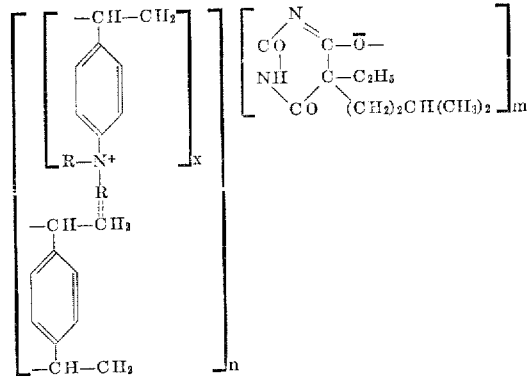

"X," the degree of cross linkage of the resin, may lie within the range 5 to 100 inclusive. That is the cross linking may vary from 20% to 1% (or one molecular unit of divinyl benzene to five units of styrene [20%] on one hand, to one unit of divinyl benzene to one hundred molecular units of styrene [1%]).

The value $m/n$ represents the degree of saturation of the resin with the amylobarbitone, and can be varied. Greater degrees of saturation may be obtained by, for instance, successive reactions with solutions of the amylobarbitone.

The resin-barbiturate salts formed are completely insoluble in all solvents but react with hydrogen chloride (e.g. in the stomach) and sodium chloride (e.g. in the gut) yielding the resin in the chloride form and the barbiturate or its sodium derivative as the case may be. This reaction is slow when in contact with the concentration of ions present in the gastro-intestinal tract of man or woman, and thus the salt may be used to produce an even sustained therapeutic effect over a period of, for example, 8–10 hours. A typical release picture, that of amylobarbitone from the resin salt is given below:

| | Percent |
|---|---|
| Percentage of amylobarbitone in the resin salt | 37 |
| Amount of amylobarbitone released: | |
| 2 hours | 39 |
| 4 hours | 69 |
| 6 hours | 78 |
| 8 hours | 80 |

The preparation of resin-amylobarbitone may be taken as representative of the preparation of the corresponding compounds including the other barbiturates referred to.

The salt is prepared as follows:

A 5–20% solution of sodium amylobarbitone in water is prepared and its pH value accurately determined. To 100 mils of this solution is added excess of the appropriate ion-exchange resin in the chloride form, for instance nominally 8% crossed linked, and the whole is stirred slowly for 12 hours. The pH value is adjusted at intervals to the original value with a solution of sodium hydroxide. When the pH value remains constant for 1 hour, the liquid is decanted and the salt formed is washed successively with water, alcohol, and acetone. It is then dried at a temperature preferably not exceeding 80° C. until the moisture content is less than 2%.

Modifications in the above process may be made as follows:

(a) The same steps are carried out, substituting the resin in the hydroxide form.

(b) A solution of amylobarbitone is prepared in sodium hydroxide, or other alkaline solution.

(c) A solution of amylobarbitone is prepared in acetone, or alcohol.

(d) The resin-barbiturate salt produced as above is further submitted to reaction with a fresh solution of amylobarbitone.

This is a continuation in part of copending Serial No. 651,177, filed April 8, 1957.

We claim:

1. A sustained release medicament comprising a strongly basic anionic exchange resin of cross linked polystyrene having a barbiturate adsorbed thereon.

2. A medicament according to claim 1 wherein the basic resin contains quaternary ammonium groups.

3. A sustained release medicament comprising basic anion exchange resin having a polystyrene base cross linked between 1% and 20% and a barbiturate adsorbed thereon.

4. A sustained release medicament comprising a strongly basic anionic exchange resin consisting of a polystyrene polymer cross linked with divinyl benzene and containing quaternary ammonium groups having adsorbed thereon at least one medicament selected from the group consisting of phenobarbitone, amylobarbitone, thiobarbitones, quinalbarbitone, butobarbitone and pentobarbitone.

5. A sustained release medicament comprising basic ion exchange resin which is a cross linked substituted polystyrene having adsorbed thereon a thiobarbitone.

6. A sustained release medicament comprising basic ion exchange resin which is a cross linked substituted polystyrene having adsorbed thereon quinalbarbitone.

7. A sustained release medicament comprising basic ion exchange resin which is a cross linked substituted polystyrene having adsorbed thereon butobarbitone.

8. A sustained release medicament comprising basic ion exchange resin having adsorbed thereon pentobarbitone.

References Cited in the file of this patent

UNITED STATES PATENTS

| | | |
|---|---|---|
| 2,498,687 | Larsen | Feb. 28, 1950 |
| 2,591,573 | McBurney | Apr. 1, 1952 |
| 2,697,059 | Gustus | Dec. 14, 1954 |
| 2,990,332 | Keating | June 27, 1961 |

OTHER REFERENCES

Winters: Drug and Allied Ind., vol. 36, July 1950, pp. 19–24.

Saunders: J. Pharm. and Pharm., 5:9, September 1953, pp. 569–578.

Martin: Ion Exchange and Adsorption Agents in Medicine, Little, Brown & Co., Boston, 1955, pp. 20–30 and 121.

Chaudhry: J. Pharm. and Pharm., vol. 8, November 1956, pp. 975–986.

Calmon: Ion Exchange in Organic and Biochemistry, Interscience Pub., New York, 1957, pp. 150–151.

UNITED STATES PATENT OFFICE
CERTIFICATE OF CORRECTION

Patent No. 3,108,044                                October 22, 1963

Stephen Paul Rety et al.

It is hereby certified that error appears in the above numbered patent requiring correction and that the said Letters Patent should read as corrected below.

Column 3, line 15, after "resin" insert -- which is a cross linked substituted polystyrene --.

Signed and sealed this 14th day of July 1964.

(SEAL)

Attest:

ESTON G. JOHNSON                                  EDWARD J. BRENNER
Attesting Officer                                     Commissioner of Patents